United States Patent [19]

Seguchi et al.

[11] 4,042,487

[45] Aug. 16, 1977

[54] METHOD FOR THE TREATMENT OF HEAVY PETROLEUM OIL

[75] Inventors: Koji Seguchi, Hino; Minoru Sugita; Kazuyoshi Inada, both of Tokyo; Kiyoshi Tagaya, Funabashi; Yuji Nakamura, Tokyo, all of Japan

[73] Assignee: Kureha Kagako Kogyo Kabushiki Kaisha, Tokyo, Japan

[21] Appl. No.: 683,925

[22] Filed: May 6, 1976

[30] Foreign Application Priority Data

May 8, 1975   Japan .................................. 50-55749

[51] Int. Cl.² .............................................. C10G 9/16
[52] U.S. Cl. ............................... 208/48 R; 204/155; 208/85; 208/127; 208/131; 208/132; 208/106
[58] Field of Search ................. 208/132, 131, 48, 85, 208/86, 126, 127; 204/155

[56] References Cited

U.S. PATENT DOCUMENTS

| | | | |
|---|---|---|---|
| 1,979,126 | 10/1934 | Wait | 204/155 |
| 1,983,027 | 12/1934 | Henry | 204/155 |
| 2,001,313 | 5/1935 | Pelzer | 208/76 |
| 2,139,969 | 12/1938 | Mills | 204/155 |
| 2,320,118 | 5/1943 | Blaker | 208/46 |
| 2,329,834 | 9/1943 | Hays | 208/47 |
| 2,352,791 | 7/1944 | Krumboltz | 204/155 |
| 2,664,394 | 12/1953 | Reeves | 204/155 |
| 2,908,631 | 10/1959 | Allen | 208/75 |
| 3,039,955 | 6/1962 | Honnold | 208/132 |
| 3,059,910 | 10/1962 | Moriya | 261/72 |
| 3,369,994 | 2/1968 | Slater et al. | 208/58 |
| 3,983,030 | 9/1976 | Rosynek et al. | 208/126 |

*Primary Examiner*—Delbert E. Gantz
*Assistant Examiner*—G. E. Schmitkons
*Attorney, Agent, or Firm*—Lane, Aitken, Dunner & Ziems

[57] ABSTRACT

In the thermal cracking of a heavy petroleum oil (having an API specific gravity of not more than 25) in a tubular type heating furnace, possible occurrence of coking trouble inside the furnace can be prevented by applying a magnetic field of fixed magnitude transversely to the flow of the heavy petroleum oil being introduced into the furnace or by applying a fixed magnitude of magnetic field transversely and, at the same time, applying a fixed magnitude of direct-current voltage parallel to the flow of the heavy petroleum oil being introduced into the furnace. More effective prevention of occurrence of coking can be obtained by having a specific inorganic substance incorporated in the heavy petroleum oil before the oil is subjected to the magnetic field or to simultaneous application of the magnetic field and voltage.

8 Claims, 2 Drawing Figures

METHOD FOR THE TREATMENT OF HEAVY PETROLEUM OIL

FIELD OF THE INVENTION

This invention relates to a method for treatment of a heavy petroleum oil having an API specific gravity (specific gravity indicated in accordance with the method established by the American Petroleum Institute) of not more than 25. More particularly, the present invention relates to a method whereby thermal cracking of heavy petroleum oil within a tubular type heating furnace is effected without coking within the furnace.

BACKGROUND OF THE INVENTION

Generally, the heavy petroleum oil having an API specific gravity of not more than 25 contains in a large proportion a heavy fraction called "asphaltene" which has a molecular weight of not less than 1000, a large aromatic content and a high fixed carbon content. This heavy petroleum oil, therefore has extremely high specific gravity and viscosity and a high ash content and accordingly, is difficult to handle. When the heavy petroleum oil is used as a fuel, for example, it usually is preferred to have its viscosity lowered by incorporation therein of a light fraction, although it may be used in its unmodified form in some cases. When a blend of reduced viscosity is used as a fuel in a boiler for example, it may cause coking or scale formation in the boiler (which problems are held to originate in the asphaltene contained in the blend). Thus, the blend is not suitable as a fuel.

For the heavy petroleum oil to be advantageously used as a fuel or for industrial purposes, it has been conventional practice to thermally crack the heavy petroleum oil within a tubular-type heating furnace for conversion into a light oil. In the course of this thermal cracking treatment, however, coke is produced from the feed oil and is suffered to deposit inside the furnace tube and the deposited coke produces clogging of the furnace interior and degraded thermal conductivity, with the result that the furnace operation is jeopardized and the resultant light oil is adversely affected in terms of quality and yield. Moreover, whenever there occurs deposition of coke and other residues in the furnace interior, it becomes necessary for the furnace interior to be free from the deposited coke. The operation for the removal of the deposited coke requires much time and labor and involves harsh conditions and, consequently, gradually aggravates the wear of the furnace.

SUMMARY OF THE INVENTION

It is, therefore, an object of the present invention to provide a method for advantageous treatment of the heavy petroleum oil, which method enables the heavy petroleum oil to be thermally cracked effectively any coking within the furnace system.

This object and the other objects of the present invention will become apparent from the description to be given herein below.

It has now been discovered that when the heavy petroleum oil (having an API specific gravity of not more than 25) is introduced into the tubular type heating furnace and subjected to thermal cracking, a magnetic field of fixed magnitude applied transversely to the flow of the heavy petroleum oil prevents the occurrence of coking which would otherwise occur in the furnace. It has also been discovered that more effective prevention of coking is obtainable when a fixed magnitude of direct-current voltage is applied parallel to the flow of the heavy petroleum oil simultaneously with the application of the magnetic field. It has been further discovered that the prevention of coking is accomplished quite effectively when the heavy petroleum oil is mixed in advance with a specific inorganic substance as an anti-clogging agent before the feed of the heavy petroleum oil is subjected, during thermal cracking, to the application of the magnetic field or to the simultaneous application of the magnetic field and direct-current voltage.

BRIEF EXPLANATION OF THE DRAWINGS

With reference to the accompanying drawing.

DETAILED DESCRIPTION OF THE INVENTION

Figure 1:
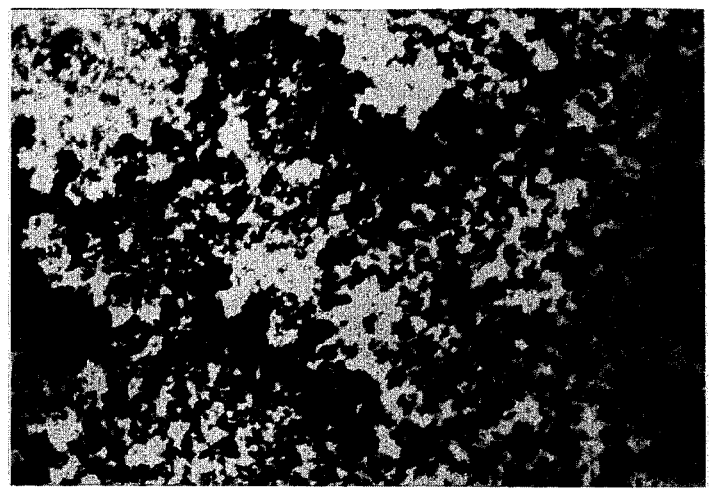
FIG. 1 is a photograph taken through an optical microscope of the bottom oil obtained when, in the thermal cracking treatment of a heavy petroleum oil (having an API specific gravity of not more than 25) in a tubular type heating furnace, a magnetic field and an electric field (caused by application of voltage) were simultaneously applied to the heavy petroleum oil being introduced into the furnace.

The types of heavy petroleum oil for which the treatment by the present invention is intended are those which have values of API specific gravity not exceeding 25 and relatively high asphaltene contents. Examples are heavy crude oils; heavy fractions such as atmospheric residues and vacuum residues of crude oils and solvent extracted asphalt; oils such as tar sand oil, natural asphalt and shale oil which are considered to be substantially similar to crude oils; and heavy fractions of such oils. The heavy petroleum oil is generally subjected to a thermal cracking treatment at temperatures of not less than 400° C, preferably in the range of from 400° to 500° C, within a tubular type heating furnace. In this thermal cracking treatment, a pressure in the furnace in the range of from atmospheric pressure to 30 kg/cm$^2$ and a time in the approximate range of from 1 to 15 minutes are sufficient.

In the thermal cracking treatment of the heavy petroleum oil within the tubular type heating furnace in accordance with the present invention, a magnetic field of 1,000 to 5,000 gausses is applied transversely to the flow of the heavy petroleum oil being introduced into the furnace. Also in the present invention, a direct-current voltage of 3 to 10 volts is applied (in the order of 50 mA to 3 A) parallel to the flow of the heavy petroleum oil simultaneously with the application of the magnetic field. The possible occurrence of coking inside of the furnace can be prevented by applying the magnetic field or by simultaneously applying the magnetic field and the direct-current voltage to the flow of the heavy petroleum oil as described above. The effectiveness of this method is evidenced by the fact that observation with the aid of an optical microscope reveals only the presence of fine gels in the bottom oil obtained by subjecting the heavy petroleum oil to the application, whereas the same observation reveals presence of extensively gelled portions in the bottom oil obtained by subjecting the heavy petroleum oil to a thermal cracking treatment according to the conventional technique. This is because the presence of extensively gelled portions in the bottom oil which results from the treatment is generally recognized to be the major cause of occurrence of coking in the furnace.

Further in the present invention, the heavy petroleum oil is mixed with a specific inorganic substance in the amount of 0.2 to 5 percent by weight, preferably 0.2 to 2 percent by weight, before the heavy petroleum oil fed to the tubular type heating furnace is subjected, for thermal cracking, to application of the magnetic field or to simultaneous application of the magnetic field and the direct-current voltage. By incorporation of the specific inorganic substance, the prevention of the occurrence of coking in the furnace can be accomplished more effectively. The inorganic substance mixed with the oil serves as an anti-clogging agent. It is obtained by subjecting to an alkali treatment an inorganic material containing, as the principal components thereof, an iron oxide and a high melting oxide such as silica, alumina or magnesia. This inorganic substance has a surface area of not less than 30 m²/g, preferably from 30 to 200 m²/g (as determined by what is called "BET method"), and an average particle diameter of not more than 30 microns. Examples of such inorganic materials are Laterite, Garnierite, Magnesite, Bauxite, Fly ash and Kyoto yellow ochre. These inorganic materials have the following compositions:

|  | Principal components | (Minor components) |
|---|---|---|
| Laterite | $Fe_2O_3, Fe_3O_4, SiO_2, Al_2O_3$, | (Cr, Ni) |
| Garnierite | $SiO_2, MgO, Fe_2O_3, Fe_3O_4$, | (Ni, Cr, Co) |
| Magnesite | $MgO, CaO, (Fe, Al_2)O_3$, |  |
| Bauxite | $Al(OH)_3, Fe_2O_3, SiO_2$, | (Ti) |
| Fly ash | $SiO_2, Al_2O_3, Fe_3O_4, Fe_2O_3$, |  |
| Kyoto yellow ochre | $Al_2O_3, SiO_2, Fe_2O_3$. |  |

Any of the listed inorganic materials can be subjected to an alkali treatment to produce the anti-clogging agent of the present invention. The alkali treatment is, for example, accomplished simply by pulverizing the inorganic material to a particle diameter of not more than 150 microns and bringing the resultant powder into contact with an aqueous solution of an alkali. Consequently, the powdered inorganic material has its surface acted upon by the alkali to produce an inorganic substance of a porous structure. For use in this alkali treatment, the aqueous alkali solution is prepared by dissolving in water a salt of an alkali metal or an alkaline earth metal. From the standpoint of solubility in water, the hydroxide or carbonate of sodium, potassium or barium is preferred over other salts of alkali metals and alkaline earth metals. Use of sodium hydroxide proves to be particularly practicable. The concentration of the aqueous solution of alkali suitably exceeds 0.1N, preferably falling in the range of from 1 to 10N. The length of the alkali treatment is usually in the range of from 1 to 30 hours. The treatment is effectively carried out at temperatures of not less than 100° C, preferably in the range of from 100° to 200° C under reflux or in an autoclave. After completion of the reaction, the inorganic substance aimed at is obtained by recovering the sediment from the reaction system, freeing the product from the excess alkali adhering thereto by washing the sediment with water and thereafter drying the refined sediment. The residue which is referred to as "red mud" and which is obtained by subjecting Bauxite to an alkali treatment in accordance with the so-called Bayer's process is embraced as one of the inorganic substances usable for the present invention.

The present invention requires the inorganic substance to be added in a proportion of 0.2 to 5 percent by weight, preferably 0.2 to 2 percent by weight, to the heavy petroleum oil (having an API specific viscosity of not more than 25). The reason for this limitation resides in the ascertained fact that when the heavy petroleum oil having incorporated therein the inorganic substance is subjected to the thermal cracking treatment, coking is almost completely avoided within the reaction system if the ratio of the surface area of the inorganic substance to the area of the internal wall surface of the system exceeds 100. The reason for the upper limit of the range is an attempt to avoid occurrence of erosion and similar troubles in the system as the result of addition of such inorganic substance. Then, in the present invention, the heavy petroleum oil containing the anti-clogging agent is introduced into a tubular type heating furnace, wherein the heavy petroleum oil is subjected to thermal cracking at temperatures of not less than 400° C, preferably in the range of from 400° to 500° C, while a magnetic field is applied or the magnetic field and the direct-current voltage are simultaneously applied parallel to the flow of the heavy petroleum oil feed being introduced into the furnace. For the purpose of this thermal cracking treatment, it is sufficient that the pressure within the heating system be in the range of from atmospheric pressure to 30 kg/cm² and the time of treatment be in the range of 1 to 15 minutes. By subjecting the heavy petroleum oil to the thermal cracking treatment in the manner as described above, the heavy petroleum oil produces an oil having low specific gravity and low viscosity without coking. When the vacuum residues of Khafji crude having a viscosity of several hundred thousand centipoises is subjected to the thermal cracking treatment as described above, for example, it is converted into an oil having a viscosity of about 2000 centipoises. Also when the heavy petroleum oil is subjected to the thermal cracking treatment, the contents of heavy metals such as nickel and vanadium in the produced oil are lower than the original contents of the same heavy metals in the heavy petroleum oil before the treatment. When the oil produced through the thermal cracking treatment is used as a fuel for boiler, for example, the scaling such as due to vanadium corrosion of superheater pipes in the boiler occurs decisively less frequently than the normal heavy oil is used as the fuel. The decreased contents of the heavy metals in the produced oil as compared with the original contents in the heavy petroleum oil may presumably be ascribed to adsorption of the heavy metals by the inorganic substance added to the heavy petroleum oil. To be more specific, the inorganic substance is a porous material having a relatively high melting point and containing 5 to 50 percent by weight of iron mainly as iron oxide and also containing not more than 1 percent by weight of an alkali metal such as sodium and potassium. Therefore, the matrix of the porous material contains iron which may as well be considered as a highly preferable solvent for vanadium and other similar heavy metals and has dispersed therein the alkali metal capable of lowering the melting point of the salt such as of vanadium. In the course of the thermal cracking treatment, heavy metals such as vanadium which are contained in the heavy petroleum oil have their solubility to iron enhanced by the alkali metal so that it is possible that they are adsorbed by the inorganic substance.

According to the present invention, the heavy petroleum oil can effectively be subjected to the thermal cracking treatment without coking as described above. Moreover, the product oil has lower heavy metal contents than the feed oil. The oil which is obtained by the thermal cracking treatment of the heavy petroleum oil according to the present invention can be put to a wide variety of uses, after it has been freed from the inorganic substance.

Where the afore-mentioned oil which has been mixed with an inorganic substance according to the present invention is burned as a fuel, the resulting exhaust gases contain reduced amounts of toxic components such as $SO_x$ (sulfur oxides) and $NO_x$ (nitrogen oxides) as commpared to when no inorganic substance is added to the oil. In other words, the oil of the invention incorporating an inorganic substance has a great advantage as a fuel oil in that its use avoids air pollution as well the corrosion of combustion equipment. Even when the inorganic-substance-containing oil is used in mixture with other known fuel oils, these effects can be retained to a certain degree depending upon the mixing ratio.

The present invention will be described more specifically with reference to working examples, which are solely illustrative of and not limitative in any way of the present invention.

EXAMPLE 1

An atmospheric residue of Iranian Heavy Crude (having an API specific gravity of not more than 25) was delivered from a storage tank to a heating line (kept at 60° C) by virtue of the head pressure. The heating line consisted of a stainless steel-pipe measuring 5 mm in inside diameter and 1 m in length. A magnetic carbon steel pipe at the center of the heating line, a magnetic field of 1,500 gausses was applied transversely relative to the longitudinal direction of the pipe and a direct-current power source rated for 3 volts and 70 mA was connected across the opposed ends of the pipe. The oil which emanated from this heating line was introduced by a gear pump at a rate of about 2 liters per hour into a stainless steel tube 8 mm in inside diameter and 15 m in length, wherein the oil was thermally cracked at a temperature 470° C. The oil produced in consequence of this thermal cracking was delivered into a flushing tower.

Figure 2:
FIG. 2 is a photograph taken through an optical microscope of the bottom oil obtained when a heavy petroleum oil (having an API specific gravity of not more than 25) was introduced into a tubular type heating furnace and subjected to a thermal cracking by the conventional technique.

The bottom oil of the flushing tower consequently obtained was spread to a small film on a slide glass and observed through an optical microscope. A photomicrograph taken during this observation is illustrated in FIG. 1. Separately, the same atmospheric residue of Iranian Heavy crude was subjected to a thermal cracking treatment without the simultaneous application of magnetic field and electric field (i.e., the conventional technique). The bottom oil of the flushing tower consequently obtained was observed microscropically in the same way as above. A photomicrograph taken of this latter product is shown in FIG. 2, in which large gel-like substances are seen to be present in the bottom oil.

An accelerated coking test effected by elevating the temperature of thermal cracking from 470° to 485° C was carried out in connection with a treatment involving the simultaneous application of magnetic field and electric field and in connection with a treatment omitting the application, to compare the length of time required for the internal pressure in the system to rise from the initial level of about 0.3 kg/cm² to a final level of 30 kg/cm². In the treatment of the present invention, the length of time was a little over twice as long as for the conventional treatment. In another test the atmospheric residue mixed in advance with 0.5 percent by weight of the product of alkali treatment of Garnierite (Origin of New Caledonia) was subjected to a thermal cracking treatment to determine the length of coking time preceding the occurrence of coking. The heating system used in this treatment withstood the operation for a period 10.5 times as long as the conventional treatment omitting the incorporation of the alkali treatment product. The conditions for the alkali treatment of Garnierite were 5 N of caustic potash aqueous solution, 100° C and 15 hours. The alkali treatment produced particles which had a surface area of about 58 m²/g and wholly passed through a sieve of 200-mesh (the average particle diameter of not more than 30 microns).

When burning the bottom oil by injection against a small burner, the resulting exhaust gases were assumed to contain about 1400 ppm of $SO_x$ in view of the sulfur content in the bottom oil. However, the exhaust gases actually contained only 95 ppm of $SO_x$. The content of $SO_3$ which would cause corrosion of the air preheater was reduced remarkably to an extremely low concentration below 5 ppm. The $NO_x$ content in the exhaust gases was as small as 28 ppm, and about 80% (by weight) reduction as compared with the $NO_x$ content in the exhaust gases resulting from combustion of the bottom oil without the additive. It was also assumed that the reductions in the amounts of $SO_x$ and $NO_x$ components of the exhaust gases were due to adsorption of $SO_x$ and $NO_x$ by the additive in the oil.

EXAMPLE 2

In the same apparatus as used in Example 1, an accelerated coking test was carried out to obain results as shown in Table 1. The heavy petroleum oil used in the test was a vacuum residue of Khafji crude having an API specific gravity of 7.2.

Table 1

| No. | Additive | Alkali treatment | Surface area (m²/g) | Relative coking time |
|---|---|---|---|---|
| 1 | Laterite (Origin of Acoje) | 5N caustic soda aqueous solution, 150° C, 15 hours | 88 | 9.9 |
| 2 | Red mud | Treated with caustic soda by Bayer's Process | 32 | 6.1 |
| 3 | Laterite (Origin of Nonoc) | 5N caustic soda aqueous solution, 150° C, 15 hours | 92 | 11.9 |

The electric field and the magnetic field which were applied in this test were the same as those of Example 1. The particle diameter of each additive was not more than about 30 μ and the amount of the additive used was 1 percent by weight.

EXAMPLE 3

In the same apparatus and under the same conditions as those used in Example 1, an accelerated coking test was carried out on a vacuum residue of Cyrus crude (having an API specific gravity of 4.6). The results were as shown in Table 2.

Table 2

| No. | Additive | Magnetic field | Electric field | Relative coking time |
|-----|----------|---------------|----------------|---------------------|
| 4 | None | 2,800 gausses | None | 1.6~1.7 |
| 5 | None | 2,800 gausses | 3V-70mA | 2.1 |
| 6 | Same to No. 1 in Example 2 | 2,800 gausses | None | 8.2 |
| 7 | Same to No. 1 in Example 2 | 2,800 gausses | 3V-70mA | 9.9 |

What is claimed is:

1. In a process for the thermal cracking, in a tubular-type heating furnace, of a heavy petroleum oil having an API specific gravity of not more than 25, the improvement comprising applying a magnetic field of from 1,000 to 5,000 gausses transversely to the flow of the heavy petroleum oil feed being introduced into the furnace.

2. In a process for the thermal cracking, in a tubular type heating furnace, of a heavy petroleum oil having an API specific gravity of not more than 25, the improvement comprising:
   a. mixing said heavy petroleum oil with 0.5 to 5% by weight of a particulate inorganic substance having a surface area of not less than 30m²/g and an average particle diameter of not more than 30 microns, said inorganic substance being obtained by an alkali treatment of an inorganic material, containing as its principal components, a high melting oxide and an iron oxide; and
   b. applying a magnetic field of from 1,000 to 5,000 gausses transversely to the flow of the mixture of the heavy petroleum oil and particulate substance feed being introduced into the furnace.

3. The process of claim 2 wherein said inorganic material is selected from the group consisting of Laterite, Garnierite, Magnesite, Bauxite, Fly ash, Kyoto yellow ochre and mixtures thereof.

4. The process of claim 2 wherein said surface area is from 30 to 200m²/g.

5. In a process for the thermal cracking, in a tubular type heating furnace, of a heavy petroleum oil having an API specific gravity of not more than 25, the improvement comprising applying a magnetic field of from 1,000 to 5,000 gausses transversely to the flow of the heavy petroleum oil feed being introduced into the furnace and simultaneously applying a direct-current of 50 mA to 3A parallel to the flow of the heavy petroleum oil feed being introduced into the furnace.

6. In a process for the thermal cracking, in a tubular type heating furnace, of a heavy petroleum oil having an API specific gravity of not more than 25, the improvement comprising:
   a. mixing the heavy petroleum oil feed to the furnace with 0.5 to 5% by weight of a particulate inorganic substance having a surface area of not less than 30m²/g and an average particle diameter of not more than 30 microns, said inorganic substance being obtained by alkali treatment of an inorganic material containing, as its principal components, a high melting oxide and an iron oxide; and
   b. applying a magnetic field of from 1,000 to 5,000 gausses transversely to the flow of the mixed feed of the heavy petroleum oil and particulate substance being introduced into the furnace and simultaneously applying a direct current of 50 mA to 3A parallel to said mixed feed flow.

7. The process of claim 6 wherein said inorganic material is selected from the group consisting of Laterite, Garnierite, Magnesite, Bauxite, Fly ash, Kyoto yellow ochre and mixtures thereof.

8. The process of claim 6 wherein said surface area is from 30 to 200m²/g.